(12) United States Patent
Dykhoff

(10) Patent No.: US 7,018,699 B2
(45) Date of Patent: Mar. 28, 2006

(54) FIRE STOP ARTICLE

(75) Inventor: Michael G. Dykhoff, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/925,553

(22) Filed: Aug. 9, 2001

(65) Prior Publication Data

US 2003/0049406 A1    Mar. 13, 2003

(51) Int. Cl.
*B32B 1/04*    (2006.01)
(52) U.S. Cl. .................. 428/76; 428/181; 428/920; 428/921; 428/345; 52/232; 52/273; 52/309.1; 52/404.1; 52/783.1; 52/787.11
(58) Field of Classification Search .............. 52/273, 52/309.1, 404.1, 784.11, 783.1, 232, 787.11; 428/345, 184, 76, 920, 921, 181
See application file for complete search history.

(56) References Cited

U.S. PATENT DOCUMENTS

| | | | | |
|---|---|---|---|---|
| 4,273,879 A | | 6/1981 | Langer et al. ................. | 521/91 |
| 4,584,214 A | * | 4/1986 | Eiermann ..................... | 428/35 |
| 4,992,310 A | | 2/1991 | Gelb et al. .................... | 428/345 |
| 5,032,447 A | | 7/1991 | Bailey ........................... | 428/184 |
| 5,402,615 A | | 4/1995 | Knott et al. .................. | 52/309.1 |
| 5,476,891 A | | 12/1995 | Welna ........................... | 524/252 |
| 5,502,937 A | * | 4/1996 | Wilson .......................... | 52/273 |
| 5,634,304 A | | 6/1997 | Sakno ........................... | 52/232 |
| 5,681,640 A | | 10/1997 | Kiser ............................ | 428/181 |
| 5,849,131 A | | 12/1998 | Shaffer et al. ............... | 156/285 |
| 6,207,085 B1 | | 3/2001 | Ackerman .................... | 252/606 |

FOREIGN PATENT DOCUMENTS

| | | |
|---|---|---|
| CA | 2111545 A1 | 6/1995 |
| DE | 198 09 973 C1 | 7/1999 |
| EP | 0 725 117 B1 | 9/1999 |
| GB | 2 278 083 A | 11/1994 |
| GB | 2278083 A * | 11/1994 |
| WO | WO 93/23245 | 11/1993 |
| WO | WO 99/38933 | 8/1999 |

* cited by examiner

*Primary Examiner*—Patrick Joseph Ryan
*Assistant Examiner*—Jane Rhee
(74) *Attorney, Agent, or Firm*—David B. Patchett

(57) ABSTRACT

A composite fire stopping article capable of fire stopping through-penetrations without the need for a secondary reinforcement structure includes an interior insulating material, such as mineral wool, sandwiched between layers of an intumescent material. The insulating material and intumescent material may be enclosed in a bag formed of a polymeric material. The intumescent material is substantially free of graphite and consists essentially of filler material, binder material, and a hydrated alkali metal silicate intumescent component.

21 Claims, 1 Drawing Sheet

FIRE STOP ARTICLE

FIELD OF THE INVENTION

The present invention relates generally to fire stopping devices and, more particularly, to a fire stopping device including an insulating material associated with layers of intumescent material which serves to form a fire barrier in the event of a fire.

BACKGROUND OF THE INVENTION

One mechanism by which fire may spread from one compartment of a structure to another is through passages or openings, often referred to as through-penetrations, in the floors and walls. Such openings include, for example, cable access holes through which signal and power transmission cables pass.

Current methods used to prevent the spread of fire and passage of smoke through such openings include cutting two intumescent sheets to follow the contour of the penetrating cables and providing a bead of moldable intumescent putty along the perimeter of each sheet. While this technique is generally satisfactory for resisting the spread of fire and preventing the passage of smoke from one compartment to another, installation is labor intensive and time consuming In addition, fire stops fabricated in this manner do not lend themselves to repeated re-entry.

Techniques and materials for fire stopping through-penetrations are known in the patented prior art. The Bailey U.S. Pat. No. 5,032,447, for example, discloses a fire barrier material, for use in building construction, comprising a sandwich structure having first and second outside layers comprising corrugated high temperature resistant metal and at least one intermediate layer comprising a flame retardant fibrous material, wherein the corrugations are positioned on the outside layers in an array which enables the barrier material to be folded in a direction substantially perpendicular to the corrugations.

The Knott et al. U.S. Pat. No. 5,402,615 discloses a flexible barrier for preventing the spread of fire through areas of a building that includes a layer of inorganic fibrous material sandwiched between two panels of material having sufficiently high thermal conductivity to diffuse and dissipate heat without burning when exposed to a flame. The panels and fibrous material are joined together with a filament having sufficiently high tensile strength and resistance to heat to maintain the panels and layers in laminar relation.

The Kiser U.S. Pat. No. 5,681,640 discloses a passive fire protection system for the protection of conduits, cable trays, support rods, and structural steel against flame and heat in a severe total environment type fire that includes a multi-layered, flexible material containing a plurality of layers of intumescent material.

In addition, various bag-like devices for fire stopping through-penetrations are commercially available. Each of these prior devices or techniques, however, suffer from certain drawbacks or shortcomings. For example, currently available products require secondary reinforcement structures to support the intumescent material in all but the smallest openings.

Accordingly, there exists a need in the industry for a fire stop device for fire stopping through-penetrations that is inexpensive, easy to install, and can effectively fire stop larger openings than conventional devices can without the need for a secondary support structure.

SUMMARY OF THE INVENTION

The present invention provides a composite fire stop device including an interior insulating material and an intumescent material arranged around at least a portion of the interior material, the intumescent material consisting essentially of filler material, binder material, and a hydrated alkali metal silicate intumescent component. In another aspect, the intumescent material includes filler material, binder material, and an intumescent agent substantially free of graphite. More particularly, the intumescent agent generally includes less than 10% graphite by weight percent, typically less than 5% graphite, more typically less than 1% graphite, and preferably less than 0.5% graphite.

The device is designed so that when a plurality of the fire stop articles are arranged in a blank opening in a partition having a steel, wood, or concrete substrate, thereby to form a fire barrier in the opening, and the fire barrier is tested in accordance with ASTM Test E814, the fire barrier will pass the test for an opening having an area of at least 300 square inches without the aid of a secondary support structure. The substrate is the inner surface of the opening that passes through the partition and is the surface against which the fire stop articles expand in the event of a fire or fire-like conditions. Generally, it has been found that larger openings fail ASTM Test E814 on the hose stream criteria. The openings may either be empty, referred to as "blank openings," or they may have penetrating items, such as cables, pipes, or the like passing there through. Since penetrating items typically provide support to the fire barrier system, the penetrating items reduce the effective area of the opening Thus, when penetrants are present, the opening sizes described herein refer to the smaller effective area (i e. the total cross-sectional area of the opening minus the cross-sectional area of the penetrant) to be fire stopped and not the larger total area of the opening.

In one embodiment, the intumescent material further includes organic char-forming components. In another embodiment, the interior insulating material comprises inorganic fibrous material. The inorganic fibrous material may comprise fiberglass, mineral wool, refractory ceramic materials, and mixtures thereof. In one embodiment, the inorganic fibrous material is mineral wool having a nominal density of at least 4 pounds per cubic foot. Mineral wool is often sold commercially in 4, 6, and 9 pounds per cubic foot densities. The actual density, however, if often significantly less than the nominal density.

In one aspect, the interior insulating material has opposed first and second opposed major surfaces, and sheets of intumescent material are arranged adjacent at least one of the first and second surfaces The intumescent sheets may be adhesively bonded with the insulating material first and second major surfaces. In one embodiment, the article includes a bag that surrounds the intumescent material, thereby facilitating installation and minimizing the installers exposure to objectionable or irritating components, such as shot, from the insulating material.

In a specific embodiment, the invention provides a composite fire stop device including a first outer layer of intumescent material, an interior layer of mineral wool arranged adjacent the first outer layer of intumescent material wherein the mineral wool has a density of at least 4 pounds per cubic foot, and a second outer layer of intumescent material arranged adjacent the interior layer of mineral wool opposite the first outer layer of intumescent material, each of the first and second intumescent layers consisting essentially of filler material, binder material, and a hydrated alkali metal silicate intumescent agent, whereby when a plurality of such composite fire stop articles are arranged in a blank opening (i.e. one with no items passing through it) in a partition with a concrete substrate, thereby to form a fire stop barrier in the opening, the fire stop barrier is capable of passing the hose stream test in accordance with ASTM Test E814 for an opening having an area of at least 300 square inches.

BRIEF DESCRIPTION OF THE DRAWING

The present invention will be further described with reference to the accompanying drawing, in which.

DETAILED DESCRIPTION

Figure 1:
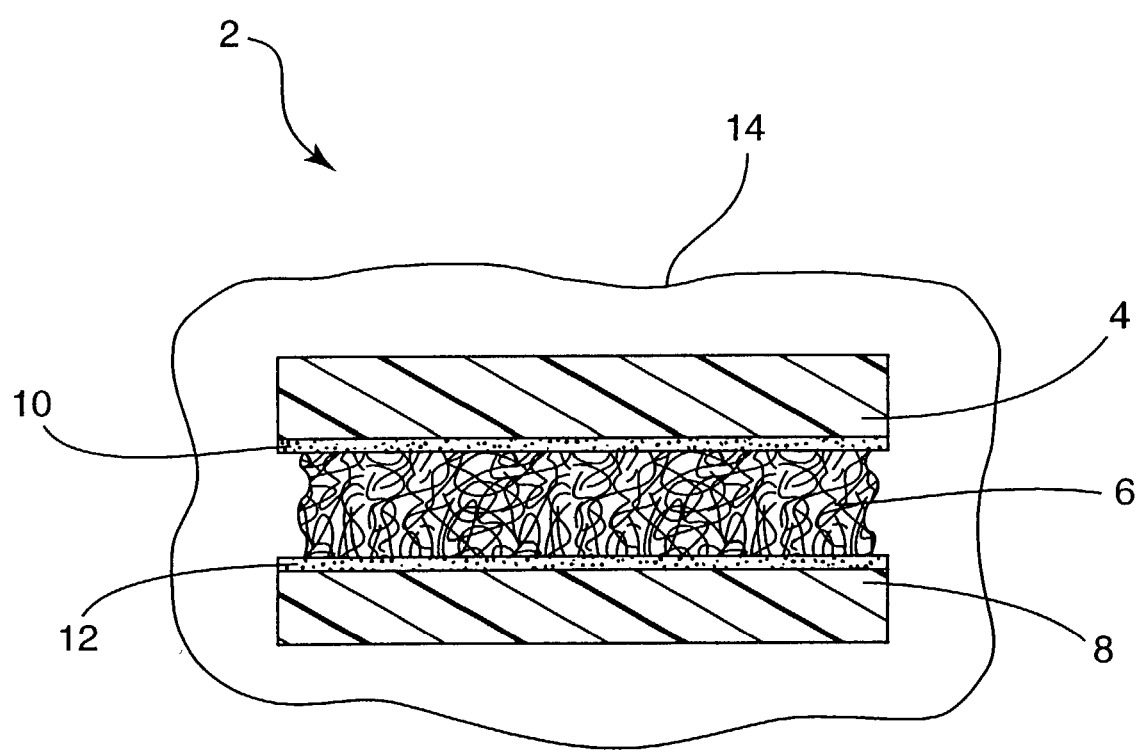
FIG. 1 is a sectional view of the fire stop article in accordance with the invention.

As used herein, the term "intumescent agent" refers to an ingredient that expands to at least about 1.5 times its original volume upon heating to temperatures typically encountered in fire-like conditions. The term "intumescent material" refers to a composition containing an intumescent agent.

Referring now to FIG. 1, there is shown an intumescent article 2 including a first layer of intumescent material 4, an interior layer of insulating material 6, and a second layer of intumescent material 8. Adhesive layers 10, 12 are provided between the first intumescent layer 4 and the insulating material 6, and between the second intumescent layer 8 and the insulating material 6 to form a laminated composite structure. Suitable adhesives include pressure sensitive adhesives, hot melt adhesives, and the like. Alternatively, the intumescent layers 4, 8 may be extruded or coated directly onto the insulating layer without the aid of an adhesive. An enclosure 14 is provided around the layers of intumescent material 4, 8 and the insulating material 6. The enclosure is provided for ease of handling and installation but is not required.

The interior layer of insulating material 6 is preferably a non-woven fibrous material having a density of at least nominally 4 pounds per cubic foot, more typically at least nominally 6 pounds per cubic foot. Materials having a density of at least nominally 8 pounds per cubic foot may also be used. The insulating material is also preferably thermally stable up to a temperature of at least about 1600° F.

Suitable materials include non-woven webs comprising man made vitreous fiber and optionally 5–10% by weight organic binder. Examples include fiberglass, mineral wool, refractory ceramic materials, and mixtures thereof. These materials are inexpensive and have good thermal insulation values that effectively reduce heat transfer across the installed fire stop barrier. Selection of a particular insulation material will depend on a number of factors related to both the individual articles and the installed fire stop system. Factors include the total quantity of fibrous insulation material in both the article and the finished system, material cost, health concerns, and ease of installation.

The total quantity of fiber is typically controlled by the density of the material, the compression of the fiber material during installation, and the ratio of fiber to unfiberized material. The non-woven fibrous web preferably contains a high ratio of fiber to unfiberized material which is also referred to as "shot". Materials that have less shot have higher insulation values. Suitable materials include man made vitreous fibers. A preferred insulation material is mineral wool due to both its low coast and minimal health concerns relative to other non-woven fibrous insulating materials. A more preferred non-woven fibrous insulating material is mineral wool made from basalt rock. Less preferred materials include those make from mixed oxides, also referred to as slag.

Since mineral wool typically sinters at temperatures experienced during a fire, there is a progress of the material from the unsintered to the sintered state between the hot and cold sides of the fire stop barrier. Generally, as a material sinters, it becomes less effective as a fire stop material. It is therefore preferred that at least a portion of the insulating material remain below approximately 1600° F. during exposure to conditions equivalent to those of ASTM E814, or conditions typically encountered in a fire or fire-like conditions. In addition, it is desirable that the average temperature of the fire stop between the hot side and the cold side be less than about 1600° F. It is possible to minimize the temperature increase at the cold side of the fire stop by maximizing the insulation value of the insulation material. Selection of webs with higher densities and/or a higher fiber to shot ratio increases the insulation value of the web.

In addition, sintering of the mineral wool is detrimental because of the significant shrinkage caused by sintering. This has the effect of decreasing the insulation value and integrity of both the articles and the installed system. Also, shrinkage can result in voids forming between adjacent fire stop articles that have been arranged in a through-penetration to form a fire barrier These voids provide paths that allow heat, flames, and smoke to pass through the fire stop barrier.

A preferred non-woven web material is 1260 BOARD MINERAL WOOL, available from Fibrex Insulation, Sarnia, Ontario. For applications where vitreous fibrous materials are objectionable, a suitable material is ULTRA DAM 4000 STRIPS available from 3M Company, St. Paul, Minn.

The layers of intumescent material 4, 8 preferably include an intumescent agent substantially free of graphite, a stabilizing agent, and a binder. The intumescent material may also include fillers and organic char forming components. A suitable intumescent material is described in the Welna U.S. Pat. No. 5,476,891. A suitable commercially available intumescent material is an organic/inorganic fire resistive elastomeric sheet available from 3M Company under the trade designation 3M FIRE BARRIER FS-195+ WRAP/STRIP. A preferred commercially available intumescent material is a flexible intumescent strip available from 3M Company under the trade designation E FIS.

In accordance with a characterizing feature of the invention, the intumescent agent is substantially free of graphite. Surprisingly, it has been found that an intumescent material having an intumescent agent substantially free of graphite develops desirable adhesive and cohesive properties upon exposure to heat. The adhesive and cohesive properties allow fire stop articles arranged in a through-penetration forming a fire stop barrier in a through-penetration to expand and adhere, thereby forming a barrier having sufficient mechanical integrity to pass the hose stream component of ASTM E814 without the need for secondary reinforcement.

While not wishing to be limited by any particular theory, intumescent materials containing graphite develop limited adhesive and cohesive properties upon expansion. The limited adhesive and cohesive properties, in turn, limit the size of the through-penetration that can be effectively fire stopped by such articles without the use of a secondary reinforcement structure. That is, fire stop barriers constructed using fire stop articles having a graphite based intumescent material are generally weak, and only relatively small through-penetrations can be fire stopped with such articles so that they are capable of passing the hose stream component of ASTM E814. For example, Table 1 shows the maximum size opening that was capable of being fire stopped with fire stop articles including a conventional graphite based intumescent material and an opening fire stopped with fire stop articles of the present invention in partitions formed of three different materials namely, steel, wood, and concrete, that passed the hose stream component of ASTM E814.

TABLE 1

Comparison of Blank Opening Size that Can Be Fire stopped to Pass Hose Stream Test Using Article with Conventional Graphite Based Intumescent Material and Using a Fire stop Article in Accordance with the Present Invention

|  | Graphite Based | Graphite Free |
|---|---|---|
| Steel | 273 in² | 540 in² |
| Wood | 174 in² | 540 in² |
| Concrete | 144 in² | 300 in² |

For steel, it was found that the size of the opening that could be fire stopped to pass the hose stream test of ASTM E814 without the need for secondary reinforcement was 98% larger for fire stop articles according to the present invention compared to conventional articles, was 210% larger for wood, and was 108% larger for concrete.

Suitable intumescent agents include granular hydrated alkali metal silicate such as described in the Langer et al. U.S. Pat. No. 4,273,879. A preferred intumescent agent is granular sodium silicate. A suitable commercially available intumescent agent is a granular hydrated alkali metal silicate intumescent composition available under the trade designation EXPANTROL 4BW PLUS from the 3M Company, St. Paul, Minn.

Useful stabilizing agents include compounds selected from the group consisting of diaryl paraphenylenediamines within following general formula I, wherein the diaryl paraphenylenediamines have a melting point ranging from about 105 to about 125° C.:

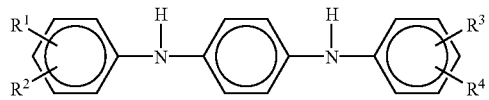

Formula I wherein $R^1$–$R^4$ inclusive are independently selected from the group consisting of hydrogen ("H") and alkyl groups having from 1 to about 5 carbon atoms, with the provisos that: i) either both of $R^1$ and $R^2$, or both $R^3$ and $R^4$ must be alkyl groups having from 1 to about 5 carbon atoms; and ii) the stabilizing agent has a melting point ranging from about 105 to about 125° C.

The stabilizing agent is either an antioxidant and/or an antiozonant, defined as a compound or mixture of compounds capable of reducing or preventing degradation of the organic binder due to exposure of the inventive compositions to oxygen and/or ozone.

A preferred stabilizing agent is commercially available from Goodyear Chemical Co., Akron, Ohio, under the trade designation WINGSTAY 100 AZ. This is a proprietary mixture of diaryl para-phenylenediamines within general formula I having a melting point ranging from 108–114° C.

The binder is preferably an organic binder, more preferably an elastomer, most preferably a chlorinated elastomer such as the polychloroprene elastomers known under the trade designation NEOPRENE and the like. Elastomeric binders are preferably selected from a class of organic char-forming elastomers such as natural rubber and synthetic rubbers such as polyisoprene and polychloroprene rubbers. Polychloroprene is a preferred elastomer because it has excellent aging properties, good weatherability and by itself is a char former when exposed to fire or heat.

The intumescent material may include fillers such as quartz sand (silica), colorants, clay, fly ash, blowing agents, perlite, vermiculite, inorganic fibers such as glass fibers and mineral wool, and organic fibers to adjust hardness and reduce cost.

If the binder is non-char-forming, a char-forming additive is preferably added to the composition. Suitable non-char-forming polymers include chlorinated polyethylenes such as those known under the trade designations PARACHLOR (from Uniroyal Chemical) and TYRIN (from Dow Chemical); chlorosulfonated polyethylenes such as those known under the trade designation HYPALON (du Pont); polybutene; and polysulfide polymers.

Char-forming resins useful in the compositions include phenolic resins, polycarboimide resins, urea-aldehyde resins, and melamine-aldehyde resins. The general term "phenolic" includes phenol-formaldehyde resins as well as resins comprising other phenol-derived compounds and aldehydes.

In accordance with another characterizing feature of the invention, the article is constructed with the non-woven web of insulating material 6 sandwiched between layers of intumescent material 4, 8 Alternatively, the intumescent material 4, 8 may completely surround the fibrous insulating material 6 Forming the article to include intumescent material on the outer surface allows the intumescent material to expand and make contact with intumescent material from an adjacent article in the event of a fire. Since the expanded intumescent material is adhesive, the articles combine to form a structural barrier that prevents fire and smoke from passing through the opening, and further provides a barrier with sufficient mechanical integrity to pass the hose stream component of ASTM E814 without the use of secondary support structures or reinforcement.

For example, as presented in Table 1, fire stop articles according to the invention can be arranged in an opening in a partition such as a wall, floor, or ceiling to provide a fire stop barrier capable of passing the hose stream test in accordance with ASTM E814 in a 540 square inch opening for a partition constructed of steel, a 540 square inch opening for a partition constructed of wood, and a 300 square inch opening for a partition constructed of concrete, all without any secondary reinforcement structure.

The ability of the present invention to be used to fire stop openings larger than conventional techniques without the need for secondary reinforcement reduces installation time, facilitates re-entry into the opening, reduces cost, decreases the complexity of the installation, and simplifies job-site logistics.

The enclosure 14 provided around the layers of intumescent material 4, 8 and the insulating material 6 prevents or minimizes the exposure of the installer to objectionable components of the composition. In addition, the enclosure 14 allows adjacent articles to be slid next to each other, thereby facilitating installation. A preferred enclosure is a sealed bag formed of a suitable polymeric film material such as polyethylene film.

A desirable feature of the present invention is that it develops cohesive and adhesive properties that allow passage of the hose stream component of ASTM E814 without the need for secondary reinforcement. The need for secondary reinforcement is a prominent undesirable feature of fire stop systems constructed from materials commercially available.

Since fire stop barriers are often re-entered, it is preferred that articles of the present invention not form adhesive or cohesive bonds at ambient temperatures. If the articles form adhesive bonds at ambient temperatures, the articles may be damaged during re-entry, therefore making re-entry difficult, costly, and time consuming. The present invention preferably only has adhesive/cohesive properties at high temperatures. The bond formation temperature can be controlled by choosing outer layers of intumescent material that are not adhesive/cohesive at ambient temperatures or by including slip layers (e.g. a polyethylene film) on the outer surfaces of the intumescent material. As noted previously, the slip layers may be provided by enclosing the intumescent material in a sealed bag.

Fire stop materials are generally at least partially ablative so as a fire progresses the materials near the hot side lose their effectiveness. Consequently, both the non-woven fibrous interior material and the intumescent material ablate and lose their effectiveness. This has the effect of destroying the cohesive and/or adhesive bonds.

Two approaches may be used to ensure an effective bond between adjacent articles. First, the bonds may form at low temperatures and thereby cover a large fraction of the interface in excess of which will ablate during a fire. Alternatively, a bond region at or near the hot side may form and gradually move towards the cold side as the cohesive/adhesive component gradually ablates and the bond is destroyed. Generally, the progression of the bond line through the intumescent material will be faster than the progression of sintering line through the non-woven fibrous web. It is desirable that the cohesive/adhesive component forms a char, thereby protecting the bond and slowing the ablation of the article. The char may occupy the same location as the bond.

The composition of the intumescent material preferably includes a high proportion of a thermoplastic polymer which may be either uncross-linked or cross-linked to a small degree. Thermoplastic polymers are preferred because they typically undergo viscous flow at temperatures present in fires The flow of the material allows the material to penetrate the non-woven fibrous insulating material and form a bond therewith. The flow of most thermoplastic polymers, however, is too great under fire-like conditions. The viscous flow properties of the thermoplastic polymer may be modified, however, by adding fillers and cross-linking the thermoplastic polymer. Furthermore, appropriate fillers, such as aluminum trihydroxide (ATH), also impart fire resistive properties to the composition. Suitable polymers include polychloroprene, fluoropolymers, EVA, and acrylics. Polymers which are inherently fire retardant are especially well suited for this application.

Intumescent systems of the present invention have an intermediate level of expansion. If the expansion is too great, it may destroy the wall (or floor), or be forced out of the through-penetration and thereby fail. In addition, intumescent fire stop materials generally become more friable during and after expansion. With increasing expansion and the corresponding decrease in density, a point is reached where the material's integrity is too low to pass the ASTM E814 hose stream test.

EXAMPLE

Fire stop articles were constructed as shown in FIG. 1. Each article was constructed with an interior layer 6 of 1260 BOARD MINERAL WOOL available from Fibrex Insulation, of Sarnia, Ontario, which is made of basalt rock and has a nominal density of 6.0 pounds per cubic foot and an actual density of not less than approximately 4.0 pounds per cubic foot and a shot level of about 12% sandwiched between outer layers 4, 8 of 1/16 inch thick flexible intumescent strip available from 3M Company, St. Paul, Minn. under the trade designation E FIS The outer layers 4, 8 of E-FIS were adhesively bonded to the interior layer of mineral wool with 9672LE HIGH STRENGTH ADHESIVE available from 3M Company, St. Paul, Minn. The articles were packaged in 3-mil polyethylene bags. The nominal dimensions of the completed article were 2.125 inch×60 inch×9.0 inch.

Fifty of the above described articles were installed in a 30 inch×18 inch framed opening in a 2-hr framed UL400 Series wall. The framed opening had a steel substrate for adhesion. The articles were installed with the 9.0 inch dimension traversing the wall. The articles were stacked in five columns of ten each. The vertical compression was 18.0%, the horizontal compression was 0.0%, and the area compression was 18.1%.

When subjected to a 1 hour ASTM E814 Fire test the assembly met the hose stream, F-rating, and T-rating criteria.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A fire barrier assembly for fire stopping an opening in a partition, comprising a plurality of fire stop articles arranged in the opening without a secondary support structure, each fire stop article comprising an interior insulating material, and an intumescent material arranged around at least a portion of said interior insulating material, said intumescent material comprising filler material, binder material, and a hydrated alkali metal silicate intumescent component.

2. A fire stop article as defined in claim 1, further comprising an enclosure surrounding each said fire stop article.

3. A fire stop article as defined in claim 2, wherein said enclosure is a sealed bag formed of polymeric material.

4. A fire stop article as defined in claim 1, wherein the intumescent material further includes organic char-forming components.

5. A fire stop article as defined in claim 1, wherein said interior insulating material comprises inorganic fibrous material.

6. A fire stop article as defined in claim 5, wherein said inorganic fibrous material comprises at least one of fiberglass, mineral wool, refractory ceramic materials, and mixtures thereof.

7. A fire stop article as defined in claim 5, wherein said inorganic fibrous material comprises mineral wool having a density of at least 4 pounds per cubic foot.

8. A fire stop article as defined in claim 1, wherein said interior insulating material has opposed first and second opposed major surfaces, and further wherein sheets of intumescent material are arranged adjacent each of said first and second surfaces.

9. A fire stop article as defining in claim 8, wherein each of said intumescent sheets is adhesively bonded with said insulating material first and second major surfaces.

10. A fire barrier assembly as defined in claim 1, wherein the fire stop articles in their unexpanded state are held in place in the opening by compression.

11. A fire barrier assembly as defined in claim 1, wherein said intumescent material completely surrounds said interior insulating material.

12. A method of fire stopping an opening in a partition to form a fire barrier in the opening without a secondary support structure, comprising the step of:
(a) arranging a plurality of fire stop articles in the opening, each fire stop article comprising
　(i) an interior insulating material; and
　(ii) an intumescent material arranged around at least a portion of said interior insulating material, said intumescent material comprising filler material, binder material, and a hydrated alkali metal silicate intumescent component.

13. A method of fire stopping an opening in a partition as defined in claim 12, wherein the fire stop articles are arranged in the opening such that the fire stop articles are held in place in the opening by compression.

14. A fire barrier installation, comprising:
(a) a partition containing an opening; and
(b) a plurality of fire stop articles arranged in said opening without a secondary support structure, each fire stop article comprising
　(i) an interior insulating material; and
　(ii) an intumescent material arranged around at least a portion of said interior insulating material, said intumescent material comprising filler material, binder material, and a hydrated alkali metal silicate intumescent component.

15. A fire barrier installation as defined in claim 14, further comprising at least one item passing through said opening.

16. A fire barrier installation as defined in claim 14, wherein said opening has an area of greater than 300 square inches.

17. A fire barrier installation as defined in claim 14, wherein said partition has a concrete substrate for adhesion and said fire barrier installation passes a hose stream test in accordance with ASTM Test E814.

18. A fire barrier assembly as defined in claim 1, wherein said plurality of fire stop articles includes a column of stacked fire stop articles arranged in the opening.

19. A fire barrier assembly as defined in claim 1, wherein said intumescent material defines an exterior surface opposite said interior insulating material, and further wherein said exterior surface does not exhibit adhesive properties at ambient temperatures.

20. A fire barrier assembly as defined in claim 1, wherein said intumescent material defines an exterior surface opposite said interior insulating material, and further wherein said exterior surface does not exhibit cohesive properties at ambient temperatures.

21. A fire barrier installation as defined in claim 14, wherein said plurality of fire stop articles are removably positionable within said opening.

* * * * *